United States Patent [19]

Perry

[11] 4,220,534
[45] Sep. 2, 1980

[54] FOOD STRAINING

[76] Inventor: Joseph F. Perry, 185 York St., Stoughton, Mass. 02072

[21] Appl. No.: 948,404

[22] Filed: Oct. 4, 1978

[51] Int. Cl.² .................. B01D 23/20; B01D 35/02
[52] U.S. Cl. .................................... 210/232; 210/469; 210/475
[58] Field of Search .............. 99/413; 210/162, 232, 210/469, 475; 285/371, 398

[56] References Cited

U.S. PATENT DOCUMENTS

| 1,064,442 | 6/1913 | Cadigan | 285/371 X |
| 1,928,851 | 10/1933 | Devlin | 210/469 |
| 2,240,454 | 4/1941 | Badaracco | 210/469 X |

FOREIGN PATENT DOCUMENTS 2515093  9/1975  Fed. Rep. of Germany .......... 285/398

*Primary Examiner*—Benoit Castel
*Assistant Examiner*—Richard W. Burks
*Attorney, Agent, or Firm*—Charles Hieken

[57] ABSTRACT

A detachably secured food straining screen is formed with lower and upper peripheral grooves for pressure fitting engagement with the top of a cooking pot and the bottom of a cover for that pot, respectively.

2 Claims, 2 Drawing Figures

FOOD STRAINING

BACKGROUND OF THE INVENTION

The present invention relates in general to food straining and more particularly concerns novel apparatus and techniques for separating liquids from solids in cooking without using a collander while allowing the cooking pot to be used conventionally with its cover with apparatus that is relatively easy and inexpensive to manufacture, easy to install and may remain on the cooking pot, if desired.

Typically a cook wishing to drain liquids from solids dumps the contents of the pot into the collander, drains the liquid and then empties the collander into the pan.

There are prior patents disclosing pots with strainers. Examples of the prior art include the following U.S. patents:

| Patent No. | Date | Inventor |
| --- | --- | --- |
| 1,053,780 | February 18, 1913 | S. A. Brooks |
| Title: | COOKING UTENSIL | |
| 1,214,800 | February 6, 1917 | E. G. Link |
| Title: | ADJUSTABLE POT STRAINER | |
| 1,317,066 | September 23, 1919 | R. E. Bebb |
| Title: | CULINARY VESSEL | |
| 1,916,710 | July 4, 1933 | R. W. Alexander |
| Title: | STRAINING ATTACHMENT FOR PANS AND KETTLES | |
| 2,499,016 | February 28, 1950 | R. M. Buckley |
| Title: | POT STRAINER | |
| 3,269,545 | August 30, 1966 | P. J. Udell |
| Title: | STRAINER | |
| 3,289,849 | December 6, 1966 | E. R. Livingston et al. |
| Title: | ADJUSTABLE STRAINER | |
| 3,390,781 | July 2, 1968 | M. A. Anderson |
| Title: | FOOD STRAINER | |

It is an important object of this invention to provide an improved food strainer.

It is a further object of the invention to achieve the preceding object with a food stainer that may be detachably secured to an ordinary pot or pan while still accommodating the cover for that pot or pan.

It is still a further object of the invention to achieve one or more of the preceding objects with a strainer that may conveniently remain in the pot or pan essentially permanently, if desired.

It is still a further object of the invention to achieve one or more of the preceding objects with a strainer that is relatively easy and inexpensive to fabricate, install and remove and sufficiently low in cost that it may be retrofitted to existing pots and pans.

SUMMARY OF THE INVENTION

According to the invention, there is straining means formed with apertures for transmitting liquid while obstructing the flow of solids for covering a portion of the pot or pan opening and formed with upper and lower peripheral grooves for engagement with the upper lip of a pot or pan and the lower lip of the pot or pan cover respectively. Preferably, the straining means is made of Teflon or other suitable material, such as plastic or stainless steel. Numerous other features, objects and advantages of the invention will become apparent from the following specification when read in connection with the accompanying drawing in which:

DETAILED DESCRIPTION OF PREFERRED EMBODIMENTS

Figure 1:
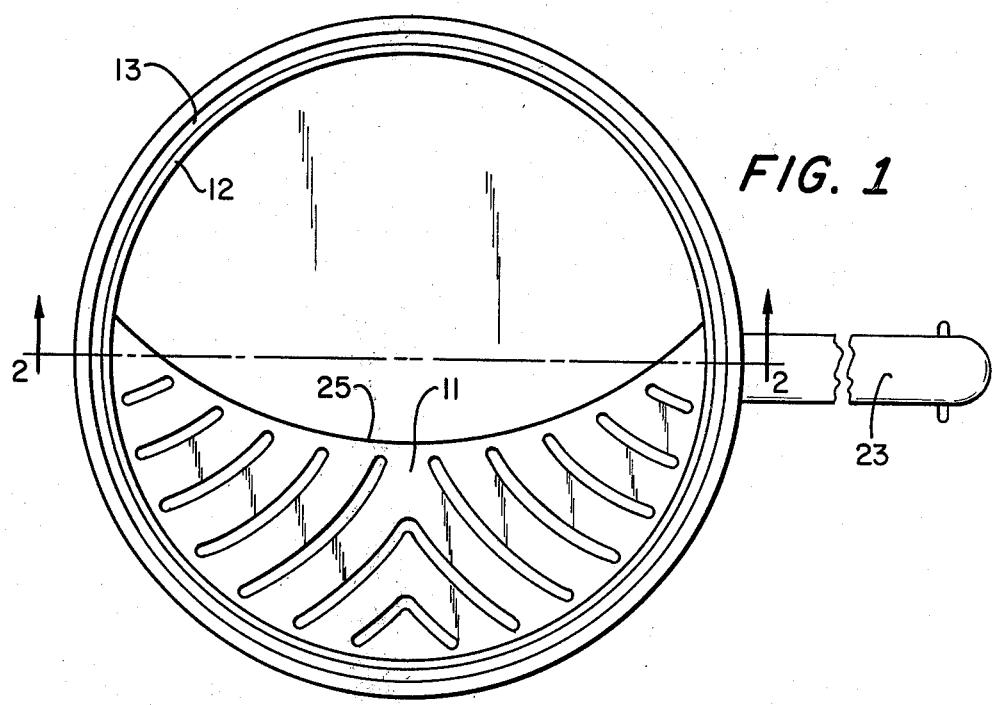
FIG. 1 is a top view of the bowl of a pot having the invention with the cover removed.
Figure 2:
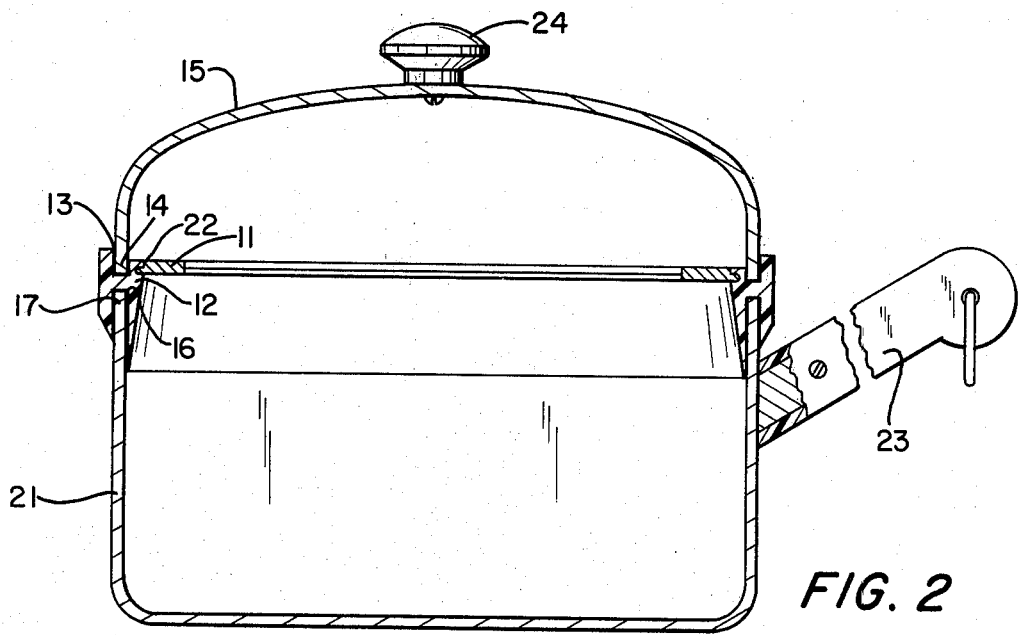
FIG. 2 is a fragmentary sectional view through section 2—2 of FIG. 1 with the cover in place.

With reference now to the drawing and more particularly FIGS. 1 and 2 thereof, there are shown top and fragmentary sectional views respectively of an embodiment of the invention. A Teflon snap-in grill 11 is seated in a Teflon ring 12 formed with an upper peripheral groove 13 for accommodating the lower lip 14 of cover 15 and a lower peripheral groove 16 for accommodating the upper lip 17 of a standard cooking pot or pan 21. Snap-in grill 11 mates with ring 12 by means of a tongue-in-groove coupling 22. Pot 21 has a handle 23, and cover 15 has a knob 24.

Having described the structural arrangement, the mode of operation will be discussed. One may obtain the ring 13 and permanently seat it on upper lip 17 of each pot and pan and then snap in grill 11 so that the latter covers a region of the pot opening between the outer circumference and a concave arc 25 of radius greater than that of the circular cross section of pot 21. The remaining opening is sufficiently large that snap-in grill 11 does not ordinarily interfere with stirring or other activities in connection with cooking. However, if the cook prefers having the entire opening while cooking, snap-in grill 11 may be conveniently removed and snapped back in shortly before time for draining the liquid from the solids.

Making the snap-in grill 11 and Teflon ring 12 in two pieces has a number of advantages. Fabrication is easier than if the assembly were a unitary structure. The ring 12 may remain permanently in place while snap-in grill 11 is easily removed and reinserted when desired. Nevertheless, it is within the principles of the invention to form grill 11 and ring 12 as a unitary structure.

There has been described novel apparatus and techniques facilitating the draining of liquids from solids in a convenient safe manner while negligibly interfering with use of a conventional pot or pan for cooking. It is evident that those skilled in the art may now make numerous uses and modifications of and departures from the specific apparatus and techniques herein disclosed without departing from the inventive concepts. Consequently, the invention is to be construed as embracing each and ever novel feature and novel combination of features present in or possessed by the apparatus and techniques herein disclosed and limited solely by the spirit and scope of the appended claims.

What is claimed is:

1. Food straining apparatus for being detachably secured to a conventional pot or pan comprising, grill means formed with a perforated portion for partially covering the opening of a conventional pot or pan for passing liquids while obstructing solids and having a periphery formed with a lower groove for snug engagement with the upper lip of a standard pot or pan and an upper groove for accommodating the lower lip of a cover for that pot or pan, said upper and lower grooves being formed in an annular ring, said perforated portion being detachably secured to said ring and comprising a snap-in grill engaging said ring in a tongue-in-groove relationship.

2. Food straining apparatus in accordance with claim 1 and further comprising a cooking container having an upper lip seated in said lower groove, and a cover having a lower lip seated in said upper groove.

* * * * *